US012783410B2

(12) United States Patent
Tian et al.

(10) Patent No.: US 12,783,410 B2
(45) Date of Patent: Nov. 3, 2026

(54) ISOLATING GARBAGE COLLECTION READ OPERATIONS IN A MEMORY SUB-SYSTEM

(71) Applicant: MICRON TECHNOLOGY, INC., Boise, ID (US)

(72) Inventors: Dahai Tian, Shanghai (CN); Ying Yang, Shanghai (CN); Antonio David Bianco, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/077,747

(22) Filed: Mar. 12, 2025

(65) Prior Publication Data

US 2026/0277801 A1 Sep. 17, 2026

(51) Int. Cl.
*G06F 12/02* (2006.01)
*G06F 13/16* (2006.01)

(52) U.S. Cl.
CPC ...... *G06F 12/0253* (2013.01); *G06F 13/1642* (2013.01); *G06F 13/1668* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768;
(Continued)

(56) References Cited

U.S. PATENT DOCUMENTS 10,409,719 B2 * 9/2019 Tseng .................. G06F 12/0246
11,556,467 B1 * 1/2023 Wei ......................... G06F 3/064
(Continued)

OTHER PUBLICATIONS

NVM Express® Base Specification Revision 2.0; May 13, 2021; retrieved from https://nvmexpress.org/wp-content/uploads/NVM-Express-Base-Specification-2_0-2021.06.02-Ratified-5.pdf (Year: 2021).*

*Primary Examiner* — Daniel C. Chappell
(74) *Attorney, Agent, or Firm* — Lowenstein Sandler LLP

(57) ABSTRACT

A system comprises a plurality of memory devices. A processing device is coupled to the plurality of memory devices. The processing device retrieves a physical-to-logical (P2L) replay output from a P2L replay operation wherein the P2L replay output corresponds to a memory device of the plurality of memory devices. The processing device inserts the P2L replay output into a queue of a plurality of queues, wherein the queue corresponds to the memory device, and wherein each queue corresponds to one of the plurality of memory devices. The processing device determines whether the plurality of queues satisfies a P2L replay output aggregation threshold criterion. Responsive to determining that the plurality of queues satisfies the P2L replay output aggregation threshold criterion, the processing device selects an inactive memory device of the plurality of memory devices. The processing device performs a media management read operation on the selected inactive memory device.

20 Claims, 4 Drawing Sheets

(58) Field of Classification Search
CPC .......... G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00
See application file for complete search history.

(56) References Cited

U.S. PATENT DOCUMENTS

2018/0349026 A1* 12/2018 Richter ............... G06F 13/1668
2021/0191849 A1* 6/2021 Bianco ................ G06F 12/0246
2021/0200669 A1* 7/2021 Bianco ................ G06F 12/0891

* cited by examiner

ISOLATING GARBAGE COLLECTION READ OPERATIONS IN A MEMORY SUB-SYSTEM

TECHNICAL FIELD

Embodiments of the disclosure relate generally to memory sub-systems, and more specifically, relate to isolating a garbage collection read operation in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
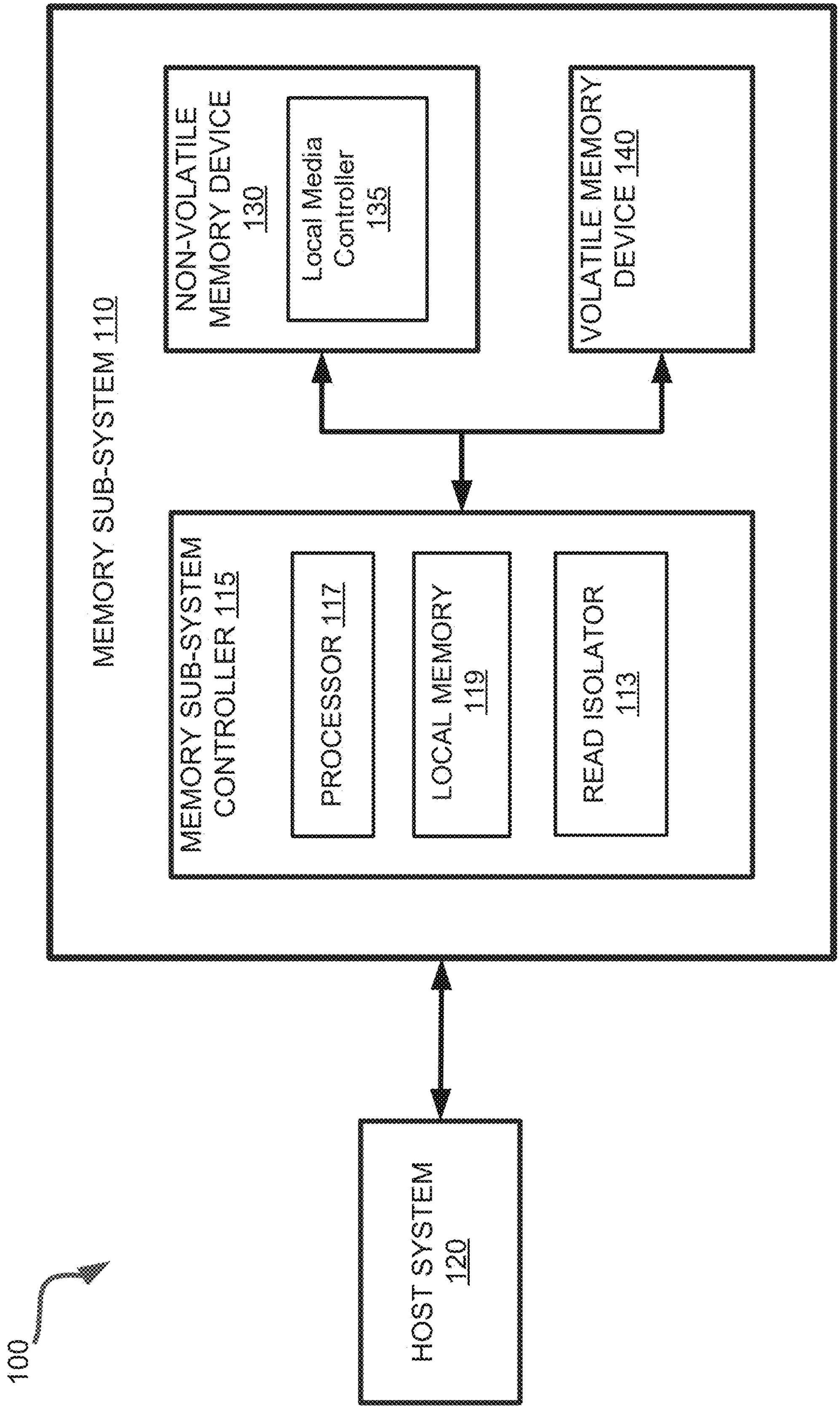
FIG. 1 illustrates an example computing system that includes a memory sub-system in accordance with some embodiments of the present disclosure.

Aspects of the present disclosure are directed to garbage collection read operation isolation in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not- and (NAND) memory device. Other examples of non-volatile memory devices are described below in conjunction with FIG. 1. A non-volatile memory device is a package of one or more dies. Each die can include of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. The memory cells can be formed onto a silicon wafer in an array of columns and rows. A bitline can refer to one or more conductive lines coupled to a column of associated memory cells in a memory device. A wordline can refer to one or more conductive lines coupled to a row of associated memory cells in a memory device that are used with one or more bitlines to generate the address of each of the memory cells. The intersection of a bitline and a wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

A key process in memory devices is Garbage Collection (GC), which reclaims storage space by invalidating and relocating user data. The GC process typically involves three main stages: P2L Replay, GC Read, and GC Write. During P2L Replay, physical-to-logical (P2L) mappings are read from the media to identify which translation units (TUs) (e.g., pages for a NAND memory device) contain valid data that need to be preserved. This information is used to generate a logical block address (LBA) bitmap, indicating which TUs are still valid (i.e., in use) and which TUs can be marked as invalid (i.e., not in use). Subsequently, as part of a GC read operation, the system issues commands to retrieve the valid data from the memory device, and the GC write operation programs this data to new physical locations in the memory device while updating the Logical-to-Physical (L2P) address mappings accordingly.

These GC operations occur within logical units (LUNs)—each representing a single die in NAND devices- and are organized into LUN Stripes, which are collections of LUNs treated as a single unit for reading, writing, or erasing memory operations. Each LUN within a LUN Stripe must perform the same operations in parallel to ensure synchronization and efficiency. Concurrently, host writes and periodic updates to the L2P table take place, generating multiple threads that access the LUNs simultaneously. The randomness in which each thread accesses a LUN can lead to multiple types of commands—GC Reads, GC Writes, host writes, and L2P table updates—targeting the same LUN at unpredictable times.

The attempted simultaneous execution of GC Read, GC Write, host writes, and L2P table updates in storage systems leads to significant resource contention within individual LUNs. Some memory devices are limited to one memory operation per LUN. As a result, when a GC read operation, which is critical for the garbage collection process, coincides with programming operations such as GC write or host write operation on the same LUN, the operations compete for access to the underlying LUN. The competition forces one operation to wait for the other to complete, resulting in sequential processing that drastically reduces efficiency. This delay not only slows down the garbage collection process but also impairs the overall IOPS (input-output per second) performance by limiting the system's ability to handle high workloads effectively. For example, while a GC Read should ideally take approximately 50 microseconds, resource contention can extend this time to over 500 microseconds. This delay not only slows down the garbage collection process but also impairs the overall IOPS performance by limiting the system's ability to handle high workloads effectively.

Aspects of the present disclosure address the above and other deficiencies by providing a memory sub-system that can isolate garbage collection read operations. Specifically, the system can isolate garbage collection read operations from programming operations to avoid resource contention within individual LUNs and the resulting latency. Upon retrieving a P2L replay output from a P2L replay operation, the system can insert the P2L replay output into one of multiple queues. The P2L replay output can include an LBA table, which stores the L2P address mappings for the TUs, as well as an LBA bitmap, which indicates which TUs are still valid. Each queue corresponds to one of the memory devices (e.g., a LUN/a NAND die). Upon the satisfaction of a threshold criterion, the system can select an inactive memory device. Satisfying the threshold criterion can include determining that a certain number of P2L replay outputs have been inserted across the multiple queues. In some implementations, selecting the inactive memory device can include identifying a memory device that is engaged in programming operations from a non-programming memory device bitmap and determining if the queue corresponding to the identified memory device comprises a pending inserted P2L replay output. If the memory device has had a P2L replay output inserted, the memory device can be selected as the inactive memory device, and a media management read operation (e.g., a garbage collection read operation) can be performed on the selected inactive memory device. If the memory device has not had a P2L replay output inserted, the system can move onto the next memory device in the non-programming memory device bitmap and perform the same checks.

Advantages of the present disclosure include, but are not limited to, improved latency for memory sub-system operations. The system mitigates the collisions between GC read operations and programming operations within the same LUN. By isolating GC Reads from competing write operations, GC Read efficiency is improved, thereby improving the overall efficiency of the garbage collection process.

FIG. 1 illustrates an example computing system 100 that includes a memory sub-system 110 in accordance with some embodiments of the present disclosure. The memory sub-system 110 can include media, such as one or more volatile memory devices (e.g., volatile memory device 140), one or more non-volatile memory devices (e.g., non-volatile memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., volatile memory device 140) can be, but are not limited to, random access memory (RAM), such as dynamic random access memory (DRAM) and synchronous dynamic random access memory (SDRAM).

Some examples of non-volatile memory devices (e.g., non-volatile memory device 130) include a not- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the non-volatile memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the non-volatile memory device 130 (e.g., perform media management operations on the non-volatile memory device 130). In some embodiments, memory sub-system 110 is a managed memory device, which is a raw non-volatile memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a read isolator component 113 that can isolate garbage collection read operations. In some embodiments, the memory sub-system controller 115 includes at least a portion of the read isolator component 113. In some embodiments, the read isolator component 113 is part of the host system 120, an application, or an operating system. In other embodiments, local media controller 135 includes at least a portion of read isolator component 113 and is configured to perform the functionality described herein.

The read isolator component 113 can isolate garbage collection read operations. Specifically, the read isolator component 113 can isolate garbage collection read operations from programming operations to avoid resource contention within individual LUNs and the resulting latency. Upon retrieving a P2L replay output from a P2L replay operation, the read isolator component 113 can insert the P2L replay output into one of multiple queues. The P2L replay output can include an LBA table, which stores the L2P address mappings for the TUs, as well as an LBA bitmap, which indicates which TUs are still valid. Each queue corresponds to one of the memory devices (e.g., a LUN/a NAND die). Upon the satisfaction of a threshold criterion, the read isolator component 113 can select an inactive memory device. Satisfying the threshold criterion can include determining that a certain number of P2L replay outputs have been inserted across the multiple queues. In some implementations, selecting the inactive memory device can include identifying a memory device that is not engaged in programming operations from a non-programming memory device bitmap and determining if the queue corresponding to the identified memory device comprises a pending inserted P2L replay output. If the memory device is not engaged in programming operations and has had a P2L replay output inserted, the memory device is selected as the inactive memory device, and a media management read operation (e.g., a garbage collection read operation) can be performed on the selected inactive memory device. If the memory device has not had a P2L replay output inserted, the read isolator component 113 can move onto the next memory device in the non-programming memory device bitmap and perform the same checks. Further details with regards to the operations of the read isolator component 113 are described below.

Figure 2:
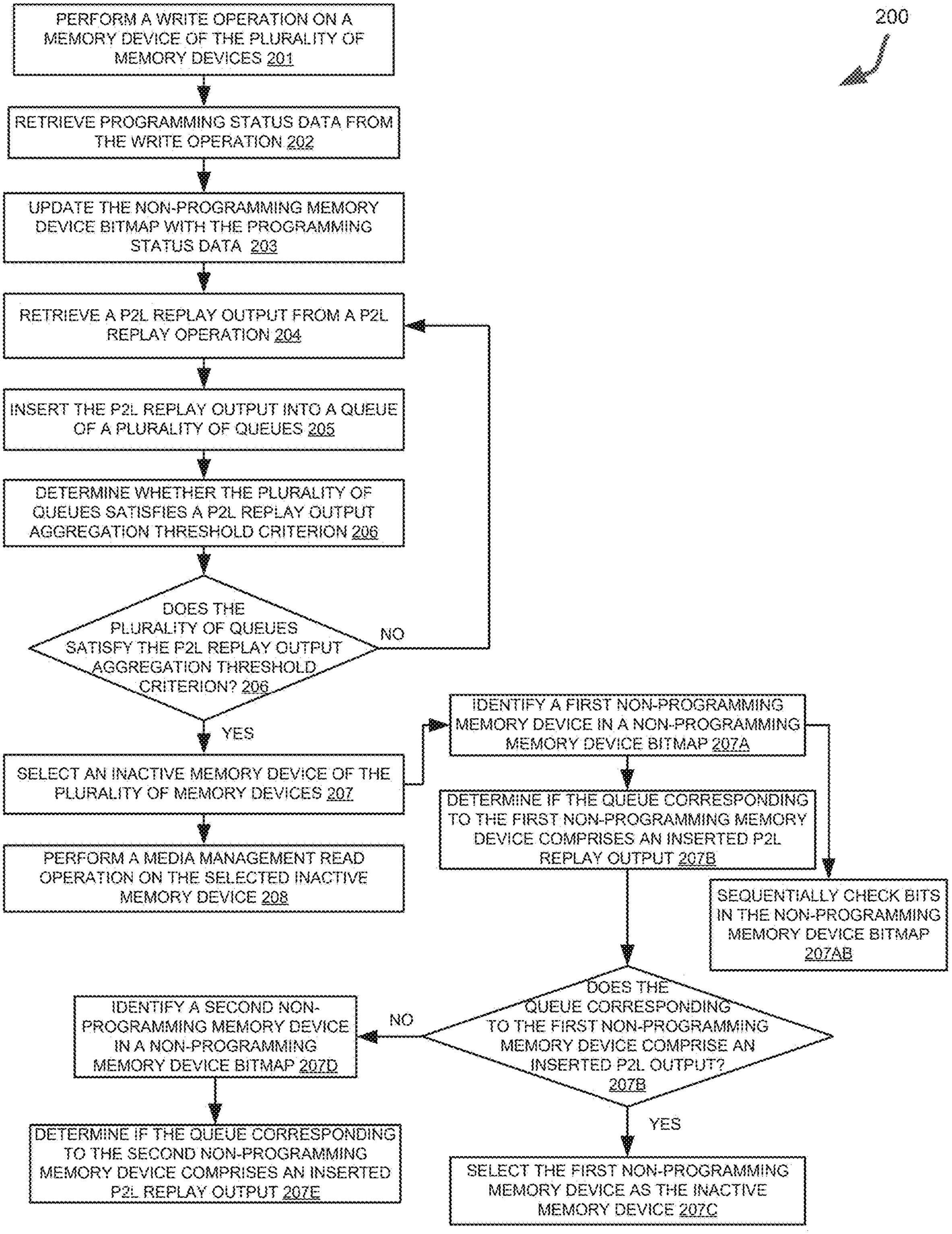
FIG. 2 is a flow diagram of an example method of isolating garbage collection read operations, in accordance with some embodiments of the present disclosure.

FIG. 2 is a flow diagram of an example method 200 of isolating garbage collection read operations, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the read isolator component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
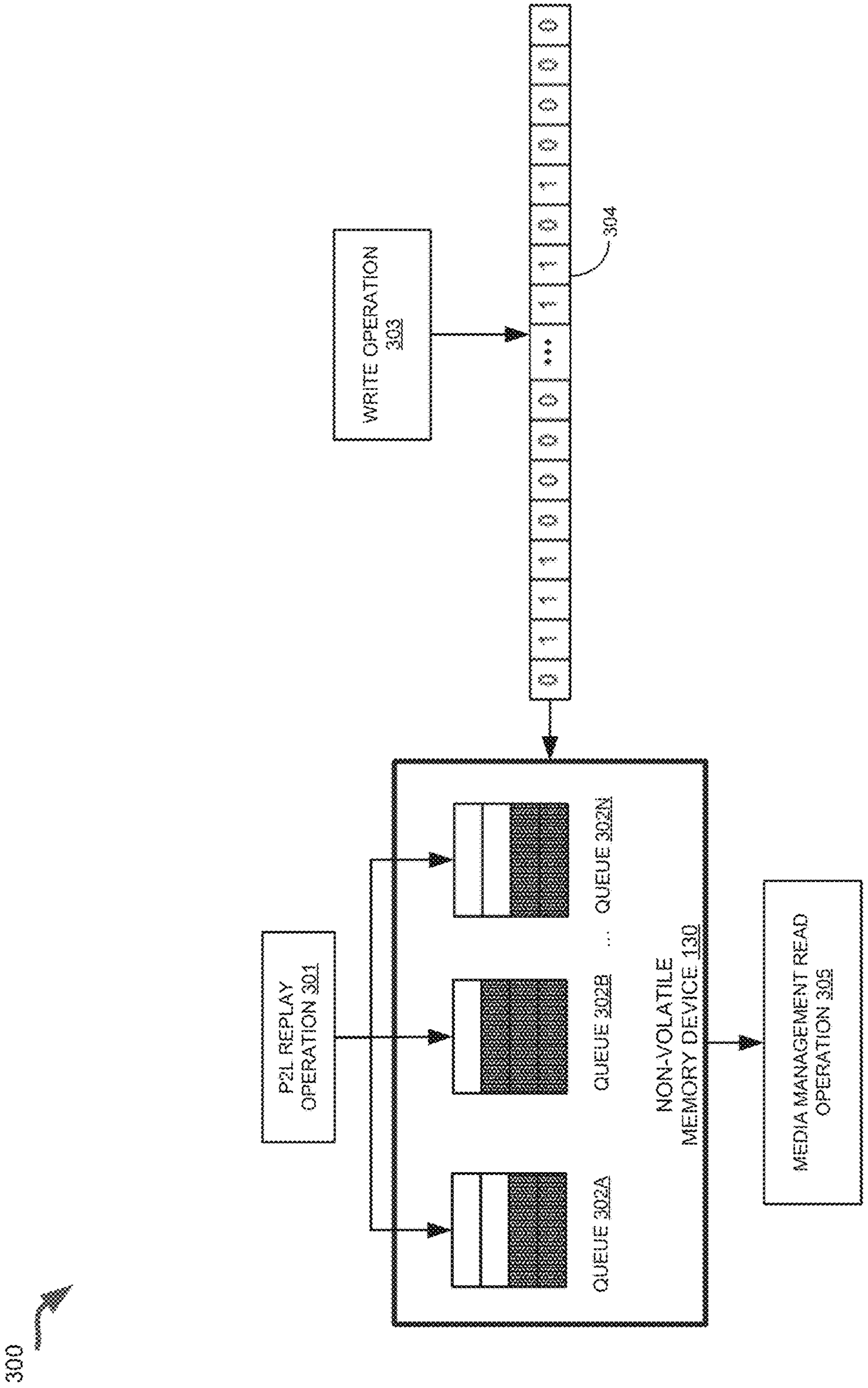
FIG. 3 is a block diagram illustrating functional segments of isolating garbage collection read operations, in accordance with some embodiments of the present disclosure

FIG. 3 is a block diagram 300 illustrating functional segments of isolating garbage collection read operations, in accordance with some embodiments of the present disclosure. These functional segments are segments of the operations performed by processing logic (e.g., the read isolator component 113). FIG. 3 illustrates a P2L replay operation 301; a non-volatile memory device 130 (e.g., a non-volatile memory device) comprising queues 302A, 302B, and 302N; a write operation 303; a non-programming memory device bitmap 304; and a media management read operation 305. Please note that alternative approaches to isolating garbage collection read operations may utilize different functional segments. Additionally, while a specific layout is depicted, the sequence of these functional segments can be modified. Consequently, the illustrated embodiment serves only as an example, allowing for modifications in their order, as well as the possibility of executing certain functional segments concurrently. Further details are provided below in at least the description of FIG. 2.

Referring to FIG. 2, at operation 204, the processing logic (e.g., read isolator component 113) retrieves a physical-to-logical (P2L) replay output from a P2L replay operation. The P2L replay output corresponds to a memory device of the plurality of memory devices. In some embodiments, a memory device comprises a logical unit (LUN) (e.g., a die in NAND devices).

The P2L (Physical-to-Logical) replay operation is a process found typically in flash-based storage systems, particularly during garbage collection (GC), where it is responsible for reconstructing the logical-to-physical (L2P) mapping and identifying valid data within a block before erasure as part of GC. A P2L replay operation is typically triggered by events that require reconstructing or verifying the logical-to-physical (L2P) mapping in NAND flash memory. In some embodiments, the trigger is garbage collection where the P2L replay operation identifies valid data before block erasure. It is also initiated during power loss recovery, reconstructing the L2P table after an unexpected shutdown, and when metadata corruption or inconsistencies are detected. Other triggers include system initialization, ensuring correct mappings on startup, wear leveling, where data is relocated to balance NAND wear, firmware updates that modify mapping structures, and NAND flash error recovery, where it helps retrieve valid data from failing blocks.

The mapping between logical and physical locations must remain accurate to ensure data integrity. In some embodiments, the P2L replay operation achieves this by sequentially scanning each TU in a block being garbage collected. A TU (e.g., a page in NAND devices) is the minimal unit to do logical address to physical address mapping. In some embodiments, the processing logic extracts the logical addresses stored within them, and cross-references this information against the current L2P mapping table. This process allows the processing logic to determine which data is still valid and needs to be migrated before the block is erased.

The P2L replay operation begins by reading P2L metadata embedded within each physical page in the block, which contains logical addresses associated with stored data. The system then issues an L2P search, using the retrieved logical addresses to look up their most up-to-date physical locations. By comparing these results with the physical addresses currently in the block undergoing garbage collection, the system can determine the validity of each TU. If the searched physical address matches the current physical address in the block, the TU is still in use and marked as valid. However, if the searched physical address points to a different physical location, this indicates that the TU has already been updated elsewhere and is now invalid. To keep track of these findings, the system generates an LBA bitmap, which records the validity status of each TU across multiple planes (MP). This bitmap plays a critical role in guiding subsequent garbage collection operations by ensuring that only valid data is selected for relocation.

Once the P2L replay process has identified valid TUs, it outputs a P2L replay output. In some embodiments, the P2L replay output comprises an LBA table and an LBA bitmap. The LBA table provides a detailed mapping of logical addresses within the block, while the LBA bitmap indicates which TUs contain valid (e.g., live) data that must be preserved.

At operation 205, the processing logic inserts the P2L replay output into a queue of a plurality of queues, wherein the queue corresponds to the memory device, and wherein each queue corresponds to one of the plurality of memory devices. In some embodiments, the plurality of queues are stored in a non-volatile memory device 130. Other embodiments can find the plurality of queues stored in a volatile memory device 140. Referring to FIG. 3, the plurality of queues is represented as queues 302A, 302B, and 302N within the non-volatile memory device 130. Within each illustrated queues are four boxes. Each of the boxes shaded dark represents a P2L replay output that has been inserted into the queue. For example, queue 302A represents a queue that has had two P2L replay outputs inserted, queue 302B represents a queue that has had three P2L replay outputs inserted, and queue 302N represents a queue that has had two P2L replay outputs inserted. Please note that the queues as represented are simplified for clarity. In implementations, the queues can vary in capacity to suit the application. In addition, alternative embodiments can implement other mechanisms for storing P2L replay outputs beyond queues. These alternative P2L replay outputs storage mechanisms are interchangeable with the queues. For example, in some embodiments, the P2L replay output information can be stored in channels (e.g., data pathways), wherein each channel corresponds to one of the plurality of memory devices.

Referring to FIG. 2, at operation 206, the processing logic determines whether the plurality of queues satisfies a P2L replay output aggregation threshold criterion. In some embodiments the P2L replay output threshold criterion is a minimum number of P2L replay outputs across the plurality of queues. As such, the plurality of queues satisfies the P2L replay output aggregation threshold criterion when the plurality of queues comprises a number of P2L replay outputs (aggregated) equal to or greater than the minimum number of P2L replay outputs. Accordingly, in some embodiments, the plurality of queues fails to satisfy the P2L replay output aggregation threshold criterion when the plurality of queues comprises a number of P2L replay outputs (aggregated) less than the minimum number of P2L replay outputs. In some embodiments, the minimum number of P2L replay outputs is predetermined. In some embodiments, the minimum number of P2L replay outputs is a predetermined multiple of a total number of memory devices of the plurality of memory devices. For example, in FIG. 3, the number of P2L replay outputs across the plurality of queues is seven. If the predetermined multiple of the total number of memory devices of the plurality of memory devices is two, the aggregation threshold criterion is satisfied because seven (the number of P2L replay outputs across the plurality of queues) is greater than six (the number of queues (three) multiplied by the predetermined multiple (two)).

In some embodiments, responsive to determining that the plurality of queues fails to satisfy the P2L replay output aggregation threshold criterion, the processing logic continues to perform P2L replay output operations and retrieve P2L replay outputs (at operation 204).

Responsive to determining that the plurality of queues satisfies the P2L replay output aggregation threshold criterion, at operation 207, the processing logic selects an inactive memory device of the plurality of memory devices. In some embodiments, in selecting an inactive memory device, at operation 207A, the processing logic identifies a first non-programming memory device in a non-programming memory device bitmap 304, wherein the first non-programming memory device is not actively engaged in programming operations. A non-programming memory device bitmap is a tracking mechanism used to indicate which memory devices (LUNs/NAND dies), are currently available for memory operations. In the context of host and garbage collection (GC) programming operations versus GC read operations, this bitmap plays a crucial role in managing parallelism and avoiding conflicts. As stated, when a memory device is engaged in host or GC programming operations, it cannot accept additional commands (such as garbage collection read commands), as simultaneous programming and GC read operations on the same memory device can lead to performance bottlenecks and operation stalls. The non-programming memory device bitmap indicates the operations status of a memory device. In some embodiments, each bit in the non-programming memory device bitmap 304 corresponds to a specific memory device, where a 'O' indicates that the memory device is engaged in a programming operation and cannot accept additional commands, while a '1' signifies that the device is available for new requests. In some embodiments, in identifying a non-programming memory device in a non-programming memory device bitmap 304, at operation 207AB, the processing logic sequentially checks bits in the non-programming memory device bitmap 304. Alternative embodiments can implement other methods for checking bits in the non-programming memory device bitmap.

The non-programming memory device bitmap 304 can be updated dynamically with operations performed on the plurality of memory devices. In some embodiments, at operation 201, the processing logic performs a write operation 303 on the memory device. In some embodiments, at operation 202, the processing logic retrieves programming status data from the write operation. In some embodiments, the programming status data is a bit indicating the memory device status. For example, as described above, a '0' indicates that the memory device is engaged in a programming operation and cannot accept additional commands, while a '1' signifies that the device is available for new operation requests (e.g., a GC read operation). In some embodiments, at operation 203, the processing logic updates the non-programming memory device bitmap with the programming status data corresponding to the memory device.

In some embodiments, in selecting an inactive memory device, at operation 207B, the processing logic determines if the queue corresponding to the first non-programming memory device comprises an inserted P2L replay output. For example, queues 303A, 303B, and 303N of FIG. 3 are queues comprising an inserted P2L replay output. Queue 303A itself comprises two P2L replay outputs. Responsive to determining that the queue corresponding to the first non-programming memory device comprises an inserted P2L replay output, at operation 207C, the processing logic selects the first non-programming memory device as the inactive memory device.

If the processing logic determines that the queue corresponding to the first non-programming memory device does not comprise an inserted P2L replay output, in some embodiments, the processing logic can repeat the same process to select an inactive memory device of the plurality of memory devices. In some embodiments, the processing logic can repeat the same process until an inactive memory device is selected, cycling through the plurality of memory devices. For example, responsive to determining that the queue corresponding to the first non-programming memory device (identified in the non-programming memory device bitmap at operation 207A) does not comprise an inserted P2L replay output, at operation 207D, the processing logic identifies a second non-programming memory device in the non-programming memory device bitmap. At operation 207E, the processing logic determines if the queue corresponding to the second non-programming memory device comprises an inserted P2L replay output.

At operation 208, the processing logic performs a media management (e.g., garbage collection) read operation on the selected inactive memory device. As part of a conventional garbage collection operation (i.e., a media management operation), the P2L replay output (e.g., the LBA table and LBA bitmap) used by the GC Read operation, which issues read commands exclusively for the valid TUs. The retrieved data is then passed to GC Write, which writes the valid information to a new block and updates the LBA table to reflect the new physical locations of the logical addresses. Once this migration is complete, the old block is erased and returned to the free block pool for future use.

Figure 4:
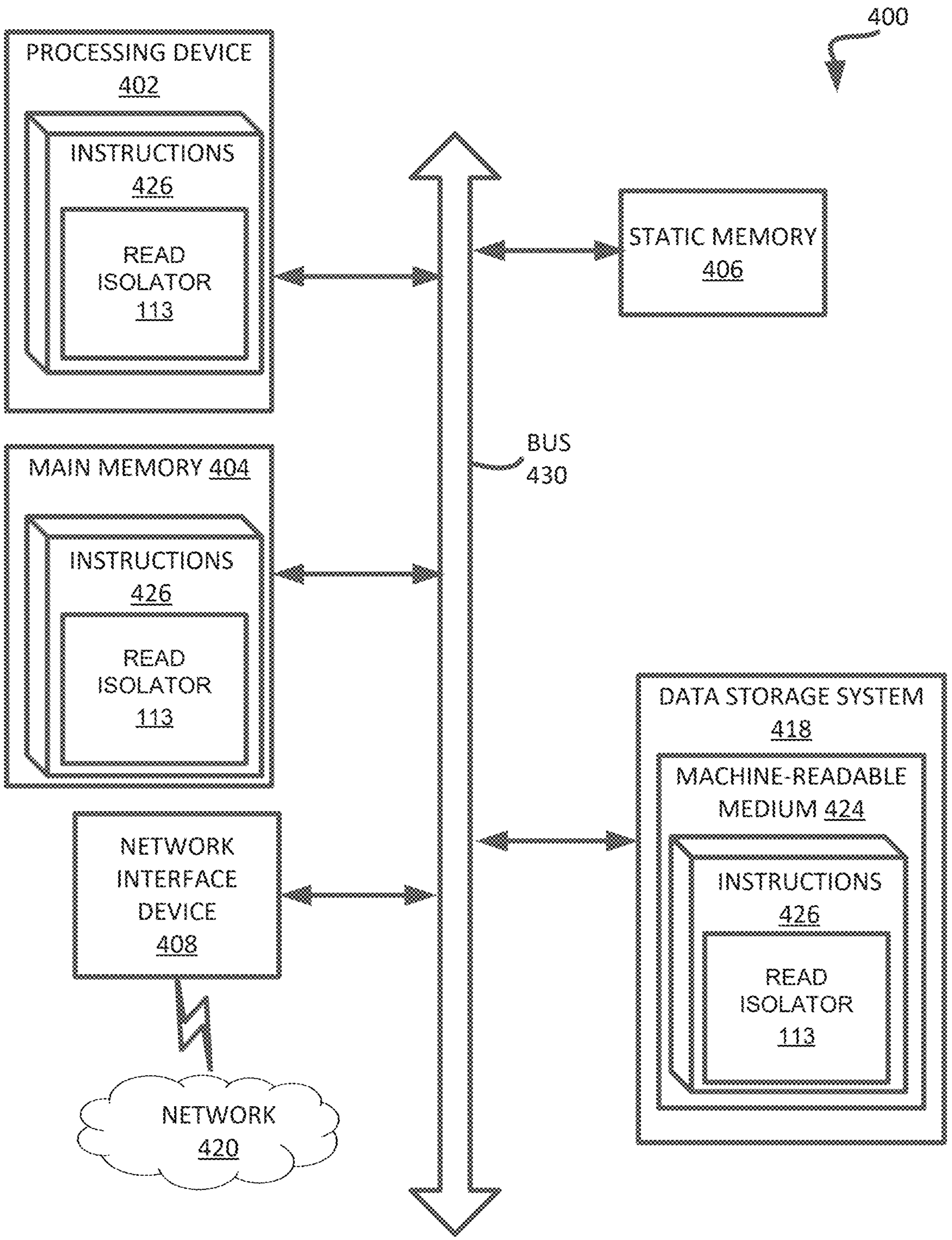
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the read isolator component 113 of FIG. 1). In alternative embodiments, the machine can be connected (e.g., networked) to other machines in a LAN, an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term “machine” shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a read isolator component (e.g., the read isolator component 113 of FIG. 1). While the machine-readable storage medium 424 is shown in an example embodiment to be a single medium, the term “machine-readable storage medium” should be taken to include a single medium or multiple media that store the one or more sets of instructions. The term “machine-readable storage medium” shall also be taken to include any medium that is capable of storing or encoding a set of instructions for execution by the machine and that cause the machine to perform any one or more of the methodologies of the present disclosure. The term “machine-readable storage medium” shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system’s registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a plurality of memory devices; and a processing device coupled to the plurality of memory devices, the processing device to perform operations comprising:

retrieving a physical-to-logical (P2L) replay output from a P2L replay operation wherein the P2L replay output corresponds to a memory device of the plurality of memory devices;

inserting the P2L replay output into a queue of a plurality of queues, wherein the queue of the plurality of queues corresponds to the memory device, and wherein each queue of the plurality of queues corresponds to one of the plurality of memory devices;

determining whether the plurality of queues satisfies a P2L replay output aggregation threshold criterion;

responsive to determining that the plurality of queues satisfies the P2L replay output aggregation threshold criterion, selecting an inactive memory device of the plurality of memory devices, wherein selecting the inactive memory device of the plurality of memory devices comprises identifying a first non-programming memory device by using a non-programming memory device bitmap, wherein the first non-programming memory device is not actively engaged in programming operations; and performing a media management read operation on the first non-programming memory device.

2. The system of claim 1, wherein the plurality of queues satisfies the P2L replay output aggregation threshold criterion when the plurality of queues comprises a minimum number of P2L replay outputs.

3. The system of claim 2, wherein the minimum number of P2L replay outputs is a predetermined multiple of a total number of memory devices of the plurality of memory devices.

4. The system of claim 1, wherein selecting the inactive memory device further comprises:

determining if the queue corresponding to the first non-programming memory device comprises an inserted P2L replay output; and responsive to determining that the queue corresponding to the first non-programming memory device comprises the inserted P2L replay output, selecting the first non-programming memory device as the inactive memory device.

5. The system of claim 4, wherein the processing device is to perform operations further comprising:

responsive to determining the queue corresponding to the first non-programming memory device does not comprise the inserted P2L replay output, identifying a second non-programming memory device in the non-programming memory device bitmap; and determining if the queue corresponding to the second non-programming memory device comprises the inserted P2L replay output.

6. The system of claim 5, wherein identifying a first non-programming memory device by using a non-programming memory device bitmap comprises sequentially checking bits by using the non-programming memory device bitmap.

7. The system of claim 4, wherein the processing device is to perform operations further comprising:

performing a write operation on the memory device;

retrieving programming status data from the write operation; and updating the non-programming memory device bitmap with the programming status data corresponding to the memory device.

8. The system of claim 1, wherein the memory device comprises a logical unit (LUN).

9. The system of claim 1, wherein the P2L replay output comprises a logical block address (LBA) table and an LBA bitmap.

10. A method comprising:

retrieving, by a processing device, a physical-to-logical (P2L) replay output from a P2L replay operation wherein the P2L replay output corresponds to a memory device of a plurality of memory devices;

inserting the P2L replay output into a queue of a plurality of queues, wherein the queue of the plurality of queues corresponds to the memory device, and wherein each queue of the plurality of queues corresponds to one of the plurality of memory devices;

determining whether the plurality of queues satisfies a P2L replay output aggregation threshold criterion;

responsive to determining that the plurality of queues satisfies the P2L replay output aggregation threshold criterion, selecting an inactive memory device of the plurality of memory devices, wherein selecting the inactive memory device of the plurality of memory devices comprises identifying a first non-programming memory device by using a non-programming memory device bitmap, wherein the first non-programming memory device is not actively engaged in programming operations; and performing a media management read operation on the first non-programming memory device.

11. The method of claim 10, wherein the plurality of queues satisfies the P2L replay output aggregation threshold criterion when the plurality of queues comprises a minimum number of P2L replay outputs.

12. The method of claim 11, wherein the minimum number of P2L replay outputs is a predetermined multiple of a total number of memory devices of the plurality of memory devices.

13. The method of claim 10, wherein selecting the inactive memory device further comprises:

determining if the queue corresponding to the first non-programming memory device comprises an inserted P2L replay output; and responsive to determining that the queue corresponding to the first non-programming memory device comprises the inserted P2L replay output, selecting the first non-programming memory device as the inactive memory device.

14. The method of claim 13, further comprising:

responsive to determining the queue corresponding to the first non-programming memory device does not comprise the inserted P2L replay output, identifying a second non-programming memory device in the non-programming memory device bitmap; and determining if the queue corresponding to the second non-programming memory device comprises the inserted P2L replay output.

15. The method of claim 13, wherein identifying a first non-programming memory device by using a non-programming memory device bitmap comprises sequentially checking bits by using the non-programming memory device bitmap.

16. A non-transitory computer-readable storage medium comprising instructions that, when executed by a processing device, cause the processing device to perform operations comprising:

retrieving a physical-to-logical (P2L) replay output from a P2L replay operation wherein the P2L replay output corresponds to a memory device of a plurality of memory devices;

inserting the P2L replay output into a queue of a plurality of queues, wherein the queue of the plurality of queues corresponds to the memory device, and wherein each queue of the plurality of queues corresponds to one of the plurality of memory devices;

determining whether the plurality of queues satisfies a P2L replay output aggregation threshold criterion;

responsive to determining that the plurality of queues satisfies the P2L replay output aggregation threshold criterion, selecting an inactive memory device of the plurality of memory devices, wherein selecting the inactive memory device of the plurality of memory devices comprises identifying a first non-programming memory device by using a non-programming memory device bitmap, wherein the first non-programming memory device is not actively engaged in programming operations; and performing a media management read operation on the first non-programming memory device.

17. The non-transitory computer-readable storage medium of claim 16, wherein the plurality of queues satisfies the P2L replay output aggregation threshold criterion when the plurality of queues comprises a minimum number of P2L replay outputs.

18. The non-transitory computer-readable storage medium of claim 16, wherein selecting the inactive memory device further comprises:

determining if the queue corresponding to the first non-programming memory device comprises an inserted P2L replay output; and responsive to determining that the queue corresponding to the first non-programming memory device comprises the inserted P2L replay output, selecting the first non-programming memory device as the inactive memory device.

19. The non-transitory computer-readable storage medium of claim 18, wherein the processing device is to perform operations further comprising:

responsive to determining the queue corresponding to the first non-programming memory device does not comprise the inserted P2L replay output, identifying a second non-programming memory device in the non-programming memory device bitmap; and determining if the queue corresponding to the second non-programming memory device comprises the inserted P2L replay output.

20. The non-transitory computer-readable storage medium of claim 18, wherein the processing device is to perform operations further comprising:

performing a write operation on the memory device;

retrieving programming status data from the write operation; and updating the non-programming memory device bitmap with the programming status data corresponding to the memory device.

* * * * *